(12) United States Patent
Saini et al.

(10) Patent No.: US 11,741,165 B2
(45) Date of Patent: *Aug. 29, 2023

(54) BUILDING MANAGEMENT SYSTEM WITH SEMANTIC MODEL INTEGRATION

(71) Applicant: Johnson Controls Tyco IP Holdings LLP, Milwaukee, WI (US)

(72) Inventors: Kunal Saini, Brookfield, WI (US); Gerald A. Asp, Milwaukee, WI (US); Matthew T. Trawicki, Franklin, WI (US); Craig A. Lind, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,705

(22) Filed: Jul. 25, 2022

(65) Prior Publication Data

US 2022/0358165 A1 Nov. 10, 2022

Related U.S. Application Data

(63) Continuation of application No. 17/039,364, filed on Sep. 30, 2020, now Pat. No. 11,397,773.

(51) Int. Cl.
*G06F 16/00* (2019.01)
*G06F 16/9035* (2019.01)
(Continued)

(52) U.S. Cl.
CPC ...... *G06F 16/9035* (2019.01); *G06F 3/04842* (2013.01); *G06F 16/28* (2019.01); *G06F 16/906* (2019.01); *G06F 16/9038* (2019.01)

(58) Field of Classification Search
CPC ..................................................... G06F 16/28
See application file for complete search history.

(56) References Cited

U.S. PATENT DOCUMENTS 5,301,109 A   4/1994   Landauer et al.
5,446,677 A   8/1995   Jensen et al.
(Continued)

FOREIGN PATENT DOCUMENTS

CN   101415011 A   4/2009
CN   102136099 A   7/2011
(Continued)

OTHER PUBLICATIONS

Balaji et al, "Brick: Metadata schema for portable smart building applications," Applied Energy, 2018 (20 pages).
(Continued)

*Primary Examiner* — Ajith Jacob
(74) *Attorney, Agent, or Firm* — Foley & Lardner LLP

(57) ABSTRACT

A building management system (BMS) includes memory devices having instructions stored thereon that, when executed by processors, cause the processors to perform operations including obtaining a BMS ontology data model defining a plurality of BMS model classes and relationships between the BMS model classes, assigning a BMS model class selected from the plurality of BMS model classes to a plurality of BMS object definitions, generating a semantic site model by classifying a plurality of BMS objects associated with a building site according to the BMS object definitions and the BMS model classes assigned thereto, and transmitting a notification using the semantic site model.

20 Claims, 14 Drawing Sheets

(51) Int. Cl.
   *G06F 3/04842* (2022.01)
   *G06F 16/9038* (2019.01)
   *G06F 16/906* (2019.01)
   *G06F 16/28* (2019.01)

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | MacKay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |

(56) References Cited

U.S. PATENT DOCUMENTS

| | | |
|---|---|---|
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | MacKay et al. |
| 2011/0087988 A1 | 4/2011 | Ray et al. |
| 2011/0088000 A1 | 4/2011 | MacKay |
| 2011/0125737 A1 | 5/2011 | Pothering et al. |
| 2011/0137853 A1 | 6/2011 | MacKay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | MacKay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Ag |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0213303 A1 | 7/2017 | Papadopoulos et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |

(56) References Cited

U.S. PATENT DOCUMENTS

| | | |
|---|---|---|
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0029845 A1 | 2/2018 | Wrycza et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0076978 A1 | 3/2018 | Schubert et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0260249 A1 | 9/2018 | Przybylski |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0299843 A1 | 10/2018 | Ray et al. |
| 2018/0299844 A1 | 10/2018 | Ray et al. |
| 2018/0299846 A1 | 10/2018 | Ray et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0079471 A1 | 3/2019 | Ray et al. |
| 2019/0088106 A1 | 3/2019 | Grundstrom |
| 2019/0094820 A1 | 3/2019 | Ray et al. |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0199548 A1 | 6/2019 | Ray et al. |
| 2019/0235454 A1 | 8/2019 | Reichl et al. |
| 2019/0268178 A1 | 8/2019 | Fairweather et al. |
| 2019/0286114 A1 | 9/2019 | Przybylski et al. |
| 2019/0310616 A1 | 10/2019 | Reichl |
| 2019/0310979 A1 | 10/2019 | Masuzaki et al. |
| 2019/0338976 A1 | 11/2019 | Chakraborty et al. |
| 2019/0356513 A1 | 11/2019 | Schubert et al. |
| 2020/0028702 A1 | 1/2020 | Sawyer et al. |
| 2020/0150603 A1 | 5/2020 | Piaskowski et al. |
| 2020/0159173 A1 | 5/2020 | Goyal |
| 2020/0159182 A1 | 5/2020 | Goyal |
| 2020/0159376 A1 | 5/2020 | Goyal |
| 2020/0159723 A1 | 5/2020 | Goyal |
| 2020/0167065 A1 | 5/2020 | Park et al. |
| 2020/0209816 A1 | 7/2020 | Cebasek et al. |
| 2020/0209822 A1 | 7/2020 | Gottschalk et al. |
| 2020/0226156 A1 | 7/2020 | Borra et al. |
| 2020/0233389 A1 | 7/2020 | Ma et al. |
| 2020/0233391 A1 | 7/2020 | Ma et al. |
| 2020/0233680 A1 | 7/2020 | Ma et al. |
| 2020/0234220 A1 | 7/2020 | Ma et al. |
| 2020/0234251 A1 | 7/2020 | Ma et al. |
| 2020/0234523 A1 | 7/2020 | Ma et al. |
| 2020/0234590 A1 | 7/2020 | Ma et al. |
| 2020/0272114 A1 | 8/2020 | Grabowski et al. |
| 2020/0285203 A1 | 9/2020 | Thakur et al. |
| 2020/0319610 A1 | 10/2020 | Ray et al. |
| 2020/0366517 A1 | 11/2020 | Ray et al. |
| 2021/0042299 A1 | 2/2021 | Migliori |
| 2021/0144210 A1 | 5/2021 | Kolhapure et al. |
| 2021/0208546 A1 | 7/2021 | Locke et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Balaji et al, "Brick: Metadata schema for portable smart building applications," Applied Energy, Sep. 15, 2018, 3 pages, (Abstract).

(56) References Cited

OTHER PUBLICATIONS

Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, the Bad and the Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).

(56) References Cited

OTHER PUBLICATIONS

Koh et al., "Plaster: An Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, 2021 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work for Your Business: A guide to effective Big Data analytics," Impackt Publishing Ltd., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on the Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Zhou, Q. et al., "Knowledge-infused and Consistent Complex Event Processing over Real-time and Persistent Streams," Further Generation Computer Systems, 2017, 76 (pp. 391-406).

Sinha, Sudhi and Al Huraimel, Khaled, "Reimagining Businesses with AI" John Wiley & Sons, Inc., Hoboken, NJ, USA, first ed. published 2020 (156 pages).

FIG. 10A

VAVBox

Equipment Definition | Configuration
Edit ←1010

✓ Display Data

| Label | Short Name | Model Class | Instance | Net Point Address | Net Point Type | Search Criteria |
|---|---|---|---|---|---|---|
| ☑ Zone Air Temp | ZN-T | ZONE_TEMPERATURE | | | | *ZN-T, ZN-Tmp, *ZoneTmp |
| ☑ Zone Air Setpoint | ZN-Setpoint | | | | | *ZN-Setpoint |
| ☑ Supply Fan Status | SF-S | FAN_STATUS | | | | *SF-S, *SupFan-S |

VAVBox

Equipment Definition | Configuration
Save | Cancel | ⊕ ⊖ ⬆ ⬇ ←1012

✓ Display Data

| Label | Short Name | Model Class | Instance | Net Point Address | Net Point Type | Search Criteria |
|---|---|---|---|---|---|---|
| ☑ Zone Air Temp | ZN-T | ZONE_TEMPERA Classify Selected Point | | | ▼ | *ZN-T, ZN-Tmp, *ZoneTmp |
| ☐ Zone Air Setpoint | ZN-Setpoint | | | | ▼ | *ZN-Setpoint |
| ☐ Supply Fan Status | SF-S | FAN_STATUS | | | ▼ | *SF-S, *SupFan-S |

1002  1004  1006  1008

| Equipment Definition | Configuration | | | | | |
|---|---|---|---|---|---|---|
| Save Cancel ⊕ ⊖ ⇧ ⇩ | | | | | | |
| ✓ Display Data | Label | Short Name | Model Class | Instance | Net Point Address | Net Point Type | Search Criteria |
| ☑ | Zone Air Temp | ZN-T | ZONE_TEMPERATURE | | | ▼ | *ZN-T, ZN-Tmp, *ZoneTmp |
| ☐ | Zone Air Setpoint | ZN-Setpoint | ZONE_SETPOINT | | | ▼ | *ZN-Setpoint |
| ☑ | Supply Fan Status | SF-S | FAN_STATUS | | | ▼ | *SF-S, *SupFan-S |

FIG. 10C

BUILDING MANAGEMENT SYSTEM WITH SEMANTIC MODEL INTEGRATION

CROSS-REFERENCES TO RELATED PATENT APPLICATIONS

This application is a continuation of U.S. patent application Ser. No. 17/039,364 filed Sep. 30, 2020, the entirety of which is incorporated by reference herein.

BACKGROUND

The present disclosure relates generally to the field of building management systems (BMSs), and more particularly to standardizing a BMS using a semantic model. A BMS is, in general, a system of devices configured to control, monitor, and manage equipment in or around a building. A BMS can include, for example, a HVAC system, a security system, a lighting system, a fire alerting system, any other system that is capable of managing building functions or devices, or any combination thereof. Equipment, spaces, and points associated with the BMS can be represented as objects in a BMS configuration dataset. To facilitate user interaction with a BMS, it may be desirable to map BMS objects to an ontology data model such that the BMS objects and object relationships are described in a semantic or natural manner.

SUMMARY

One embodiment of the present disclosure is a building management system (BMS). The BMS includes one or more memory devices having instructions stored thereon that, when executed by one or more processors, cause the one or more processors to perform operations including obtaining a BMS ontology data model defining a plurality of BMS model classes and relationships between the BMS model classes, obtaining a plurality of BMS object definitions including equipment definitions defining a plurality of different types of equipment and point definitions defining a plurality of different types of points, assigning a BMS model class to each of the plurality of BMS object definitions, where the BMS model class is a semantic identifier selected from the plurality of BMS model classes defined by the BMS ontology data model, generating a semantic site model by classifying a plurality of BMS objects associated with a building site according to the BMS object definitions and the BMS model classes assigned thereto, and controlling building equipment using the semantic site model.

In some embodiments, the operations further include receiving a user input indicating one or more user-defined object identifiers associated with a first BMS object definition of the plurality of BMS object definitions. In some embodiments, classifying the plurality of BMS object includes identifying a subset of the plurality of BMS objects that satisfy at least one of the user-defined object identifiers and classifying the subset of the plurality of BMS object as the BMS model class assigned to the first BMS object definition.

In some embodiments, the operations further include analyzing configuration data for the BMS to identify a subset of the plurality of BMS objects that satisfy each of the plurality of BMS object definitions. In some embodiments, each of the plurality of BMS objects are classified as the BMS model class assigned to a corresponding BMS object definition.

In some embodiments, assigning the BMS model class to each of the plurality of BMS object definitions further includes receiving a user selection of the BMS model class for each of the BMS object definitions and assigning the BMS model class to each of the plurality of BMS object definitions based on the user selection.

In some embodiments, the BMS objects associated with the building site include at least one of equipment objects representing specific building equipment and point objects representing specific points in the BMS.

In some embodiments, the BMS objects associated with the building site include space objects representing specific spaces in the building site and where the plurality of BMS object definitions further include space definitions defining a plurality of different spaces.

In some embodiments, the operations further include obtaining a fault detection rule for the building site, the fault detection rule including one or more fault criteria defined without reference to one or more particular BMS objects needed to evaluate the fault criteria, using the semantic site model to identify the particular BMS objects needed to evaluate the fault criteria, and detecting a fault condition by evaluating the one or more fault criteria using data associated with the particular BMS objects.

In some embodiments, evaluating the fault criteria includes comparing a value provided by one or more of the particular BMS objects against a threshold.

Another embodiment of the present disclosure is a method including obtaining a BMS ontology data model defining a plurality of building management system (BMS) model classes and relationships between the BMS model classes, obtaining a plurality of BMS object definitions including equipment definitions defining a plurality of different types of equipment and point definitions defining a plurality of different types of points, assigning a BMS model class to each of the plurality of BMS object definitions, where the BMS model class is a semantic identifier selected from the plurality of BMS model classes defined by the BMS ontology data model, generating a semantic site model by classifying a plurality of BMS objects associated with a building site according to the BMS object definitions and the BMS model classes assigned thereto, and controlling building equipment using the semantic site model.

In some embodiments, the method further includes receiving a user input indicating one or more user-defined object identifiers associated with a first BMS object definition of the plurality of BMS object definitions. In some embodiments, classifying the plurality of BMS object includes identifying a subset of the plurality of BMS objects that satisfy at least one of the user-defined object identifiers and classifying the subset of the plurality of BMS object as the BMS model class corresponding to the first BMS object definition.

In some embodiments, the method further includes analyzing configuration data for the BMS to identify a subset of the plurality of BMS objects that satisfy each of the plurality of BMS object definitions. In some embodiments, each of the plurality of BMS objects are classified as the BMS model class assigned to a corresponding BMS object definition.

In some embodiments, assigning the BMS model class to each of the plurality of BMS object definitions further includes receiving a user selection of the BMS model class for each of the BMS object definitions and assigning the BMS model class to each of the plurality of BMS object definitions based on the user selection.

In some embodiments, the BMS objects associated with the building site include at least one of equipment objects representing instances of building equipment and point objects representing specific points in the BMS.

In some embodiments, the BMS objects associated with the building site include space objects representing specific spaces in the building site and where the plurality of BMS object definitions further include space definitions defining a plurality of different spaces.

In some embodiments, the method further includes determining one or more fault detection rules for the building site, detecting a trigger condition based on the one or more fault detection rules, the trigger condition indicating a fault and a first BMS object associated with the fault, and identifying one or more additional BMS objects associated with the fault based on the semantic data model.

In some embodiments, the trigger condition includes an indication that one or more parameters associated with the first BMS object exceed a threshold.

In some embodiments, determining one or more additional BMS objects associated with the fault includes identifying a BMS model class associated with the first BMS object and identifying the one or more additional BMS objects based on the relationships between the BMS model classes.

Yet another embodiment of the present disclosure is a building management system (BMS). The BMS includes one or more memory devices having instructions stored thereon that, when executed by one or more processors, cause the one or more processors to perform operations including generating a semantic site model by classifying a plurality of BMS objects associated with a building site according to a plurality of BMS object definitions, each BMS object definition including an equipment definition defining a type of equipment and at least one point definition defining a type of point, where each BMS object definition is assigned a BMS model class selected from a BMS ontology data model, obtaining a fault detection rule for the building site, the fault detection rule including one or more fault criteria defined without reference to one or more particular BMS objects needed to evaluate the fault criteria, using the semantic site model to identify the particular BMS objects needed to evaluate the fault criteria, detecting a fault condition by evaluating the one or more fault criteria using data associated with the particular BMS objects, and initiating an automated corrective action in response to detecting the fault condition.

In some embodiments, the operations further include obtaining the BMS ontology data model defining a plurality of BMS model classes and relationships between the BMS model classes, where the BMS model classes are semantic identifiers selected from the plurality of BMS model classes defined by the BMS ontology data model.

In some embodiments, the BMS objects associated with the building site include space objects representing specific spaces in the building site and where the plurality of BMS object definitions further include space definitions defining a plurality of different spaces

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 10A-10C show an example interface for viewing and modifying BMS object definitions, according to some embodiments.

DETAILED DESCRIPTION

Building HVAC Systems and Building Management Systems

Figure 1:
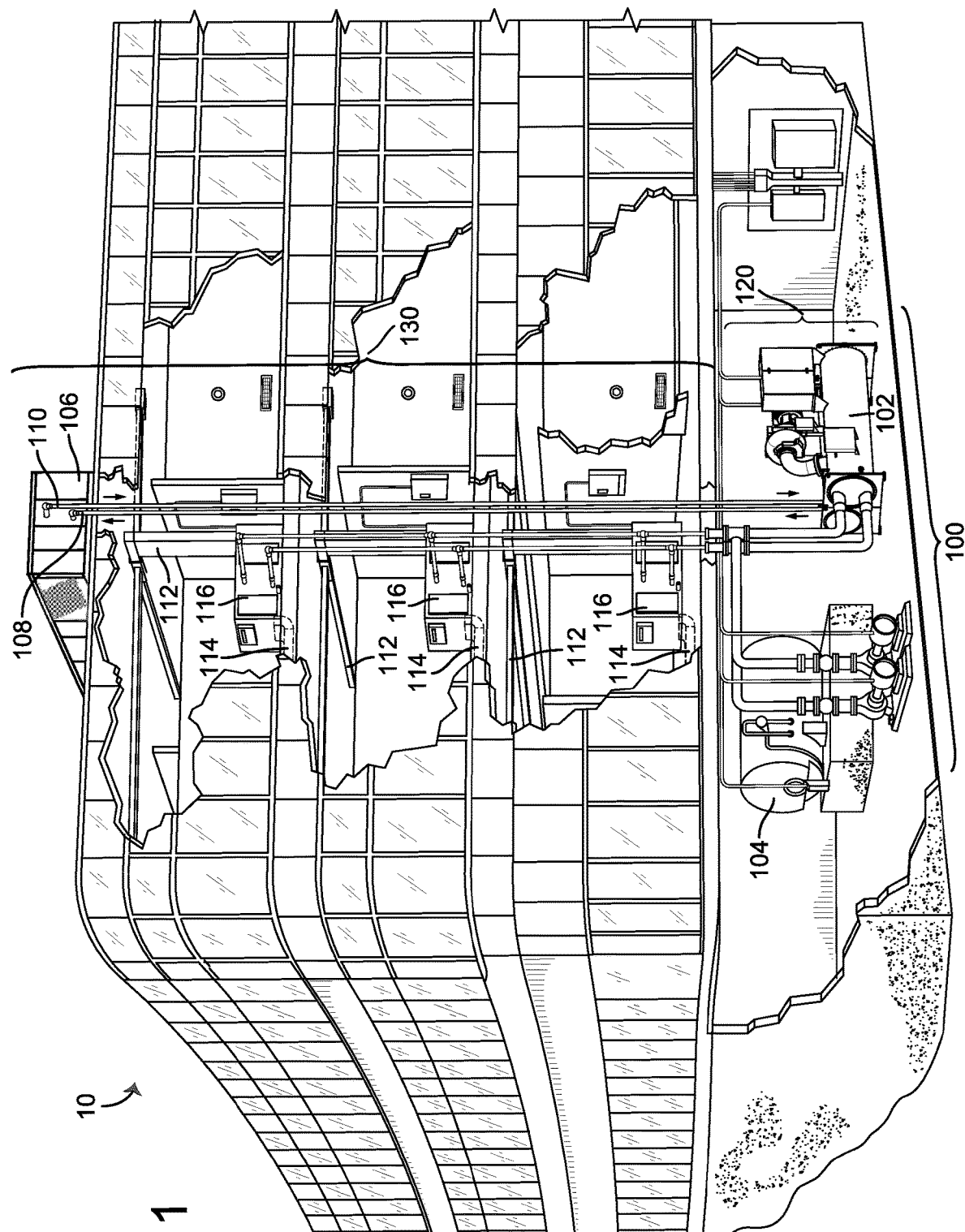
FIG. 1 is a drawing of a building equipped with a HVAC system, according to some embodiments.
Figure 2:
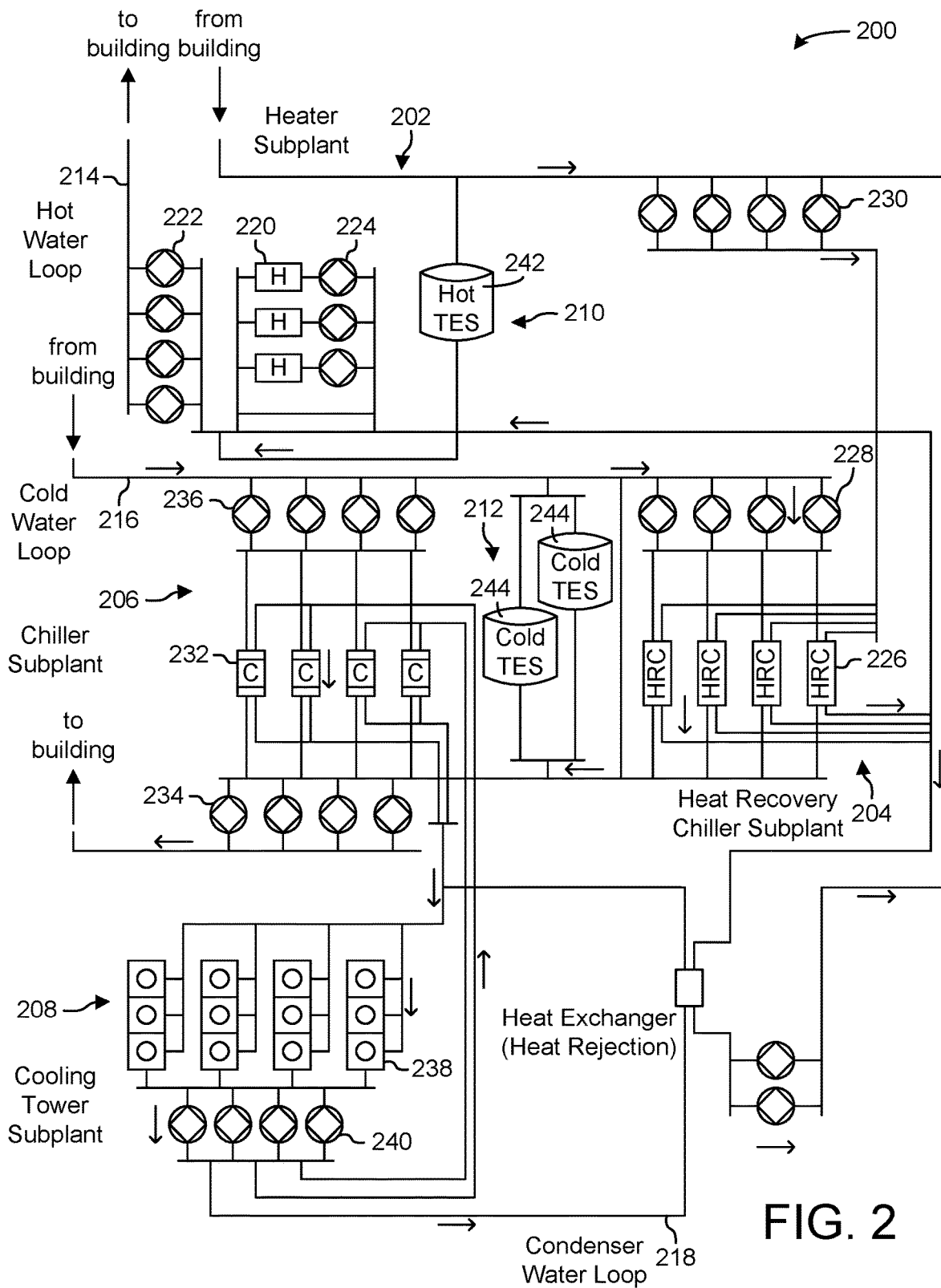
FIG. 2 is a block diagram of a waterside system that may be used in conjunction with the building of FIG. 1, according to some embodiments.
Figure 3:
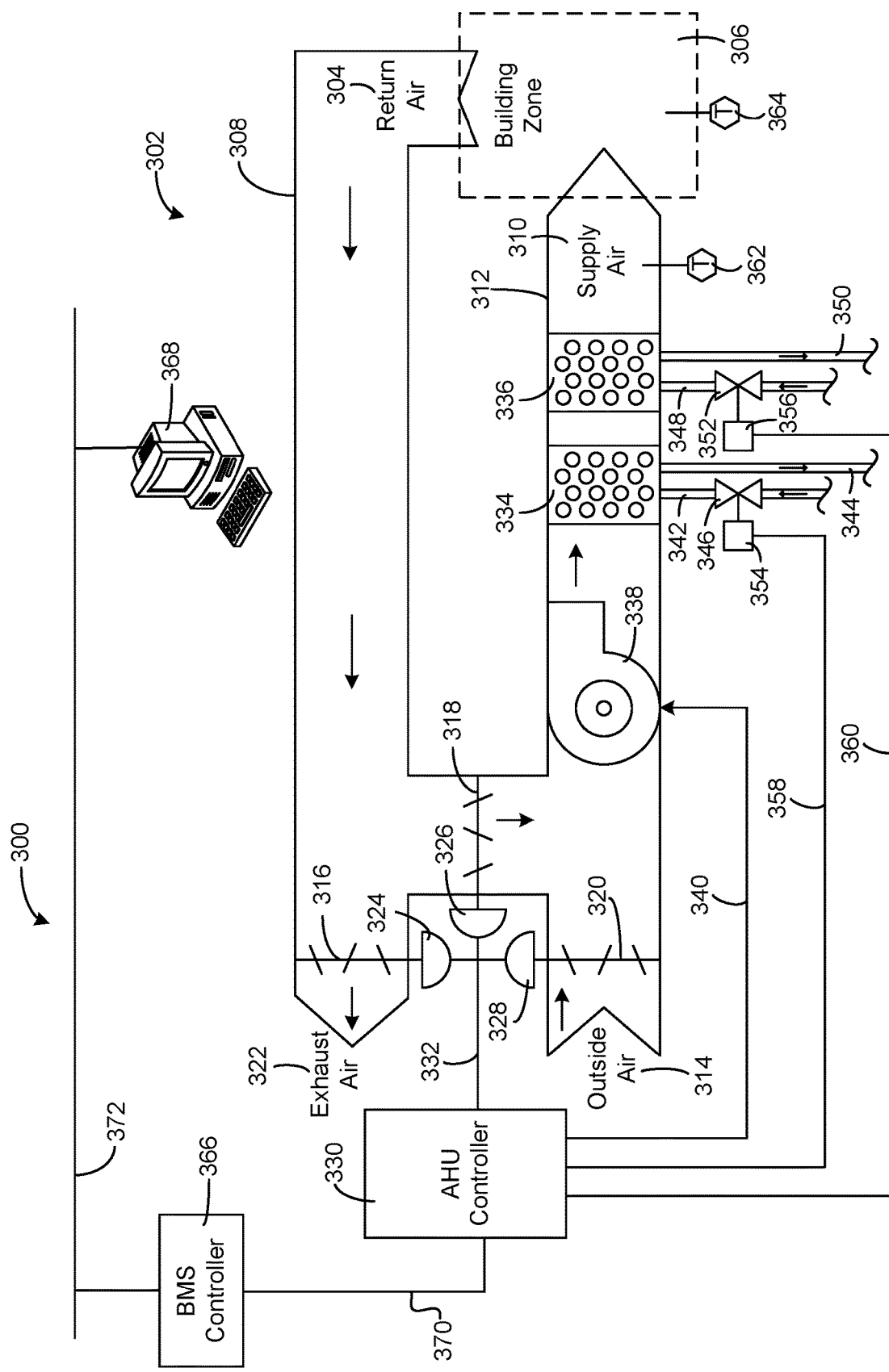
FIG. 3 is a block diagram of an airside system that may be used in conjunction with the building of FIG. 1, according to some embodiments.
Figure 4:
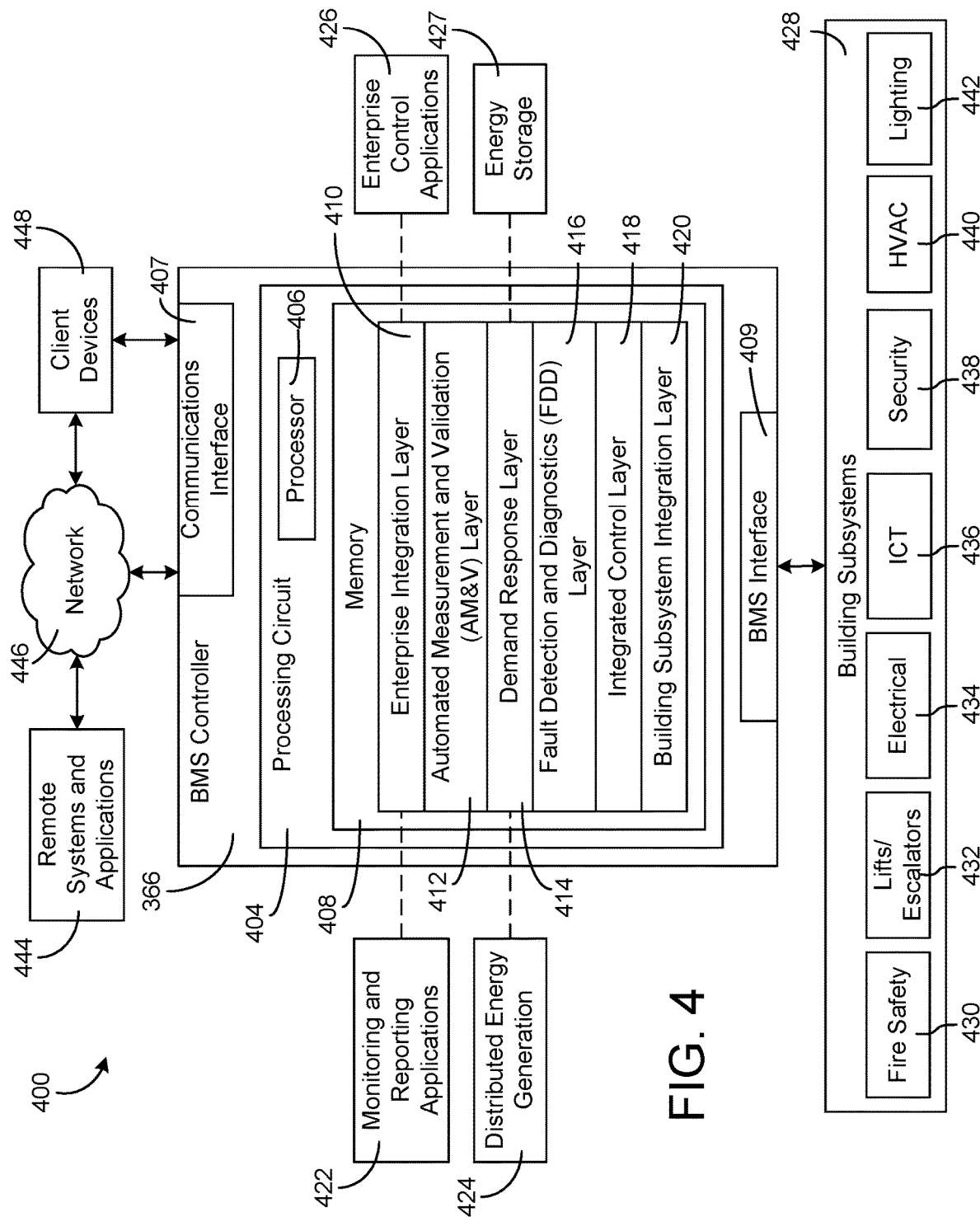
FIG. 4 is a block diagram of a building management system (BMS) that may be used to monitor and/or control the building of FIG. 1, according to some embodiments.
Figure 5:
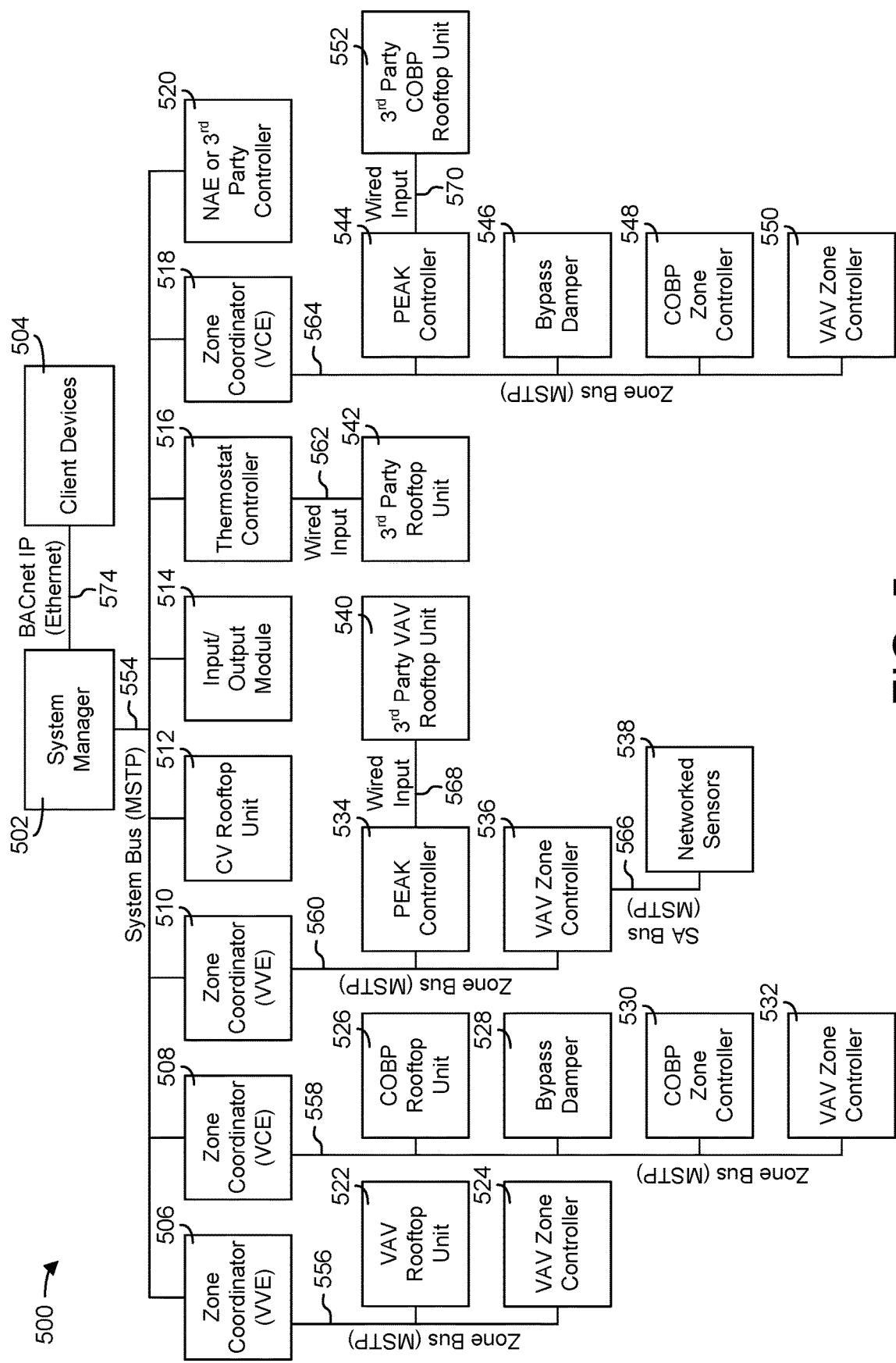
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire safety system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants Based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-Based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-Based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-Based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 Based on the inputs, generate control signals Based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) Based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be Based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs Based on one or more inputs representative of or Based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or Based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels Based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

BMS with Semantic Modeling

Figure 6:
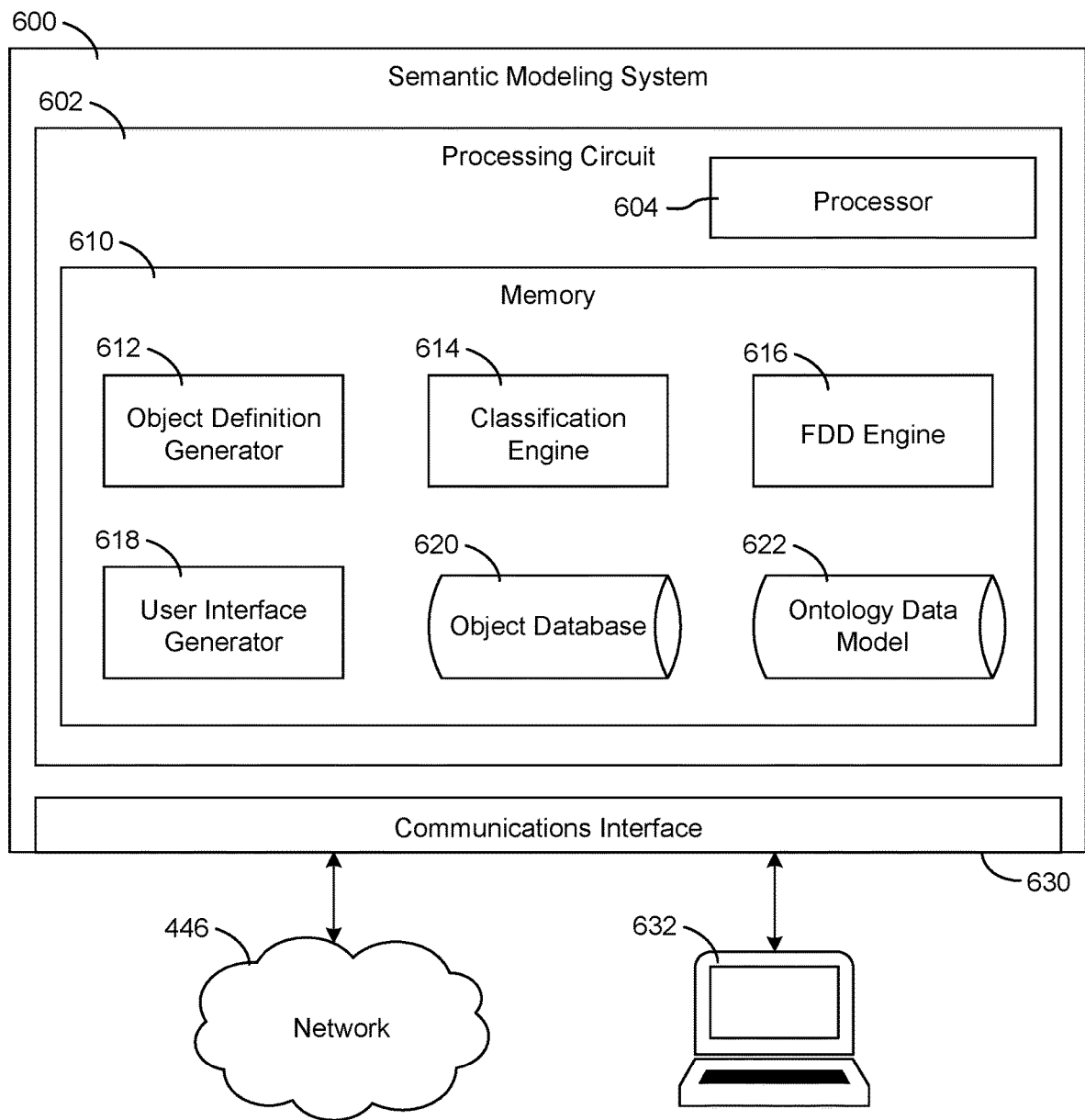
FIG. 6 is a block diagram of a semantic modeling system, according to some embodiments.

Referring now to FIG. 6, a block diagram of a semantic modeling system 600 is shown, according to some embodiments. System 600 is generally configured to generate a semantic site model for a BMS based on a BMS ontology data model. The BMS ontology data model generally describes objects in a BMS (e.g., equipment, spaces, points) and object relationships in a semantic or natural manner (e.g., using a semantic description schema). A BMS ontology data model can be applied to a BMS through the mapping or classifying of building metadata to the BMS ontology data model. In this regard, the BMS ontology data model may "standardize" a BMS (e.g., the BMS configuration data) according to the BMS ontology data model, to provide for improved monitoring, reporting, and commanding of the BMS with minimal user interaction. Additionally, a standardized BMS may be more user friendly than other systems, by defining BMS object relationships in an easy-to-understand format.

System 600 is shown to include a processing circuit 602, which further includes a processor 604 and memory 610. It will be appreciated that these components can be implemented using a variety of different types and quantities of processors and memory. Processor 604 can be implemented as a general purpose processor, an application specific integrated circuit (ASIC), one or more field programmable gate arrays (FPGAs), a group of processing components, or other suitable electronic processing components.

Memory 610 (e.g., memory, memory unit, storage device, etc.) can include one or more devices (e.g., RAM, ROM, Flash memory, hard disk storage, etc.) for storing data and/or computer code for completing or facilitating the processes, layers and modules described in the present application. Memory 610 can be or include volatile memory or non-volatile memory. Memory 610 can include database components, object code components, script components, or any other type of information structure for supporting the activities and information structures described in the present application. According to an example embodiment, memory 610 is communicably connected to processor 604 via processing circuit 602 and includes computer code for executing (e.g., by processing circuit 602 and/or processor 604) one or more processes described herein.

In some embodiments, processing circuit 602 is implemented within a single computer (e.g., one server, one housing, etc.). In other embodiments processing circuit 602 can be distributed across multiple servers or computers (e.g., that can exist in distributed locations). In some embodiments, system 600 and/or processing circuit 602 is embodied in the BMS 400 as described above, and accordingly, processing circuit 602, processor 604, and/or memory 610 may be similar to or the same as processing circuit 404, processor 406 and/or memory 408 as described above. Additionally, in such embodiments, a portion of the components of memory 610, described below, may be embodied in the BMS 400.

In some embodiments, system 600 is a stand-alone device or component not embodied in the BMS 400, and therefore includes its own dedicated processing circuit 602, processor 604, and/or memory 610. In other embodiments, system 600 is embodied as a portion of the BMS 400, a differently arranged BMS, or a building automation system (BAS), and accordingly may share a processing circuit, processor, and/or memory with any of these other BMSs or BASs. In yet other embodiments, a portion of system 600 (e.g., certain components of memory 610, described below) may be implemented via a system configuration tool, as described below with respect to FIG. 7B. A system configuration tool may be implement prior to configuring a particular BMS or a particular building site (e.g., prior to construction of the building, prior to operating building equipment, prior to activating or implementing a BMS, etc.), for example. Accordingly certain components of memory 610 may be implemented prior to operating a BMS (e.g., BMS 400).

Memory 610 is shown to include an object definition generator 612. Object definition generator 612 is generally configured to obtain unmapped object definitions (e.g., from an object database 620), and to apply user preferences and an ontology data model to the unmapped object definitions.

An unmapped object definition is generally an abstraction of an object associated with a BMS. For example, an unmapped object definition may include generic or unmodified parameters, identifiers, labels, etc., associated with a BMS object (e.g., equipment, a space, a point). In general, an unmapped object definition includes at least a name and an identifier. In some embodiments, the unmapped object definitions may be structured according to a first data schema (e.g., BACnet). Accordingly, the name and/or identifier for an unmapped object definition may not be in a semantic format. For example, the unmapped object definition may include parameters and/or identifiers in a machine language, or in a schema that is not configured to be human-readable.

In some embodiments, an unmapped object definition also includes a set of point definitions typically associated with the BMS object reprinted by the unmapped object definition. For example, an unmapped object definition for a chiller type BMS object may include a plurality of point definitions corresponding to points typically associated with a chiller (e.g., outlet water temperature, pump speed, pressure, etc.). Object database 620 may include a library of previously defined BMS object definitions associated with a variety of objects commonly found in a BMS. For example, object database 620 may include a library of unmapped object definitions corresponding to any of the building equipment described above (e.g., building subsystems 428), and to any of a plurality of spaces or points in a building site.

Object definition generator 612 may obtain an ontology data model 622 in order to generate mapped object definitions from the unmapped object definitions. Ontology data model 622 is generally a common data model that defines BMS objects according to a semantic description schema. Ontology data model 622 may include standardized names, types, parameters, etc., for a variety of objects found in a BMS (e.g., spaces, equipment, and points). Ontology data model 622 can include a tag library comprising a set of tags that may be applied to unmapped object definitions. The tags may include semantic descriptions corresponding to each of the parameters of an object definition. For example, the tags may include semantic (i.e., plain language) labels, short names, search criteria, etc., that may be applied to an unmapped object definition. Ontology data model 622 may also define standardized parameters for each type of tag stored in the tag library. Further, ontology data model 622 may define relationships between tags. Accordingly, applying ontology data model 622 to unmapped object definitions may not only translate the unmapped object definitions into a common and/or semantic description schema, but ontology data model 622 may also define relationships between object definitions semantically. For example, ontology data model 622 may indicate that an object definition for a chiller "serves" an object definition for an air handler. In some embodiments, ontology data model 622 is retrieved from a semantic model database, as described in any of U.S. patent application Ser. No. 16/379,646, U.S. patent application Ser. No. 16/379,652, U.S. patent application Ser. No. 16/379,661, or U.S. patent application Ser. No. 16/379,666, all of which are incorporated herein by reference in their entireties.

Object definition generator 612 may be configured to generate mapped object definitions from the unmapped object definitions by applying user preferences and/or the ontology data model 622 to one or more unmapped object definitions. To achieve this, object definition generator 612 may analyze the various unmapped object definitions to identify, for each unmapped object definition, an object name or other similar identifier. Based on the object name, object definition generator 612 may determine a corresponding tag or tag set from the ontology data model 622, and may apply or map the tag or tag set to the unmapped object definition. In some embodiments, this also includes applying any user preferences to the unmapped object. The user preferences may include user-define identifiers or labels for certain object definitions, and in some cases can include a model class for certain object definitions.

Memory 610 is also shown to include a classification engine 614, configured to identify BMS objects from BMS configuration data and to classify the BMS objects based on the mapped object definitions generated by object definition generator 612. More specifically, classification engine 614 may classify BMS objects identified from the BMS configuration data by identifying one or more BMS objects that satisfy (i.e., match) a mapped object definition in the semantic model, and by classifying or mapping the one or more identified BMS objects to the mapped object definition. In this regard, any parameters of the mapped object definition (e.g., associated point definitions) may also be associated with the one or more identified BMS objects. For example, the one or more BMS object may be classified according to a model class assigned to the mapped object definition and/or the point definitions associated with the mapped object definition. A semantic site model may be generated for a BMS or a building site based on this classification of the BMS objects associated with the BMS or building site according to the mapped object definitions and assigned model classes. In some embodiments, the semantic site model is generated in a similar manner to the semantic models described in any of U.S. patent application Ser. No. 16/379,646, U.S. patent application Ser. No. 16/379,652, U.S. patent application Ser. No. 16/379,661, or U.S. patent application Ser. No. 16/379,666, mentioned above.

In some embodiments, classification engine 614 is also configured to obtain configuration data for a BMS by scanning, mining, or otherwise analyzing a BMS (e.g., BMS 400) to detect and identify BMS objects such as equipment, spaces (e.g., floors, rooms, levels, etc.), and/or points associated with the BMS. For example, classification engine 614 may mine a BMS to identify equipment (e.g., HVAC equipment) and to identify spaces served by the equipment. In this regard, classification engine 614 may be configured to generate and/or update the BMS configuration based on the identification of BMS objects.

Memory 610 is also shown to include a fault detection and diagnostics (FDD) engine 616. FDD engine 616 is configured to determine one or more fault detection and/or diagnostic rules for a BMS, and to monitor the BMS to detect faults or perform diagnostic procedures. In some embodiments, FDD engine 616 is structured in a similar manner to the fault detection system described in U.S. Pat. No. 8,788,097, incorporated herein by reference in its entirety. FDD engine 616 may obtain fault detection or diagnostic rules from a user input, for example, or may obtain the rule by any other method (e.g., from a database).

FDD engine 616 may also be configured to monitor operating data corresponding to equipment, spaces, and/or points of a BMS. Said data may include, for example, current operating states or parameters, sensor or meter readings, etc. FDD engine 616 can compare the received data with the fault detection and diagnostic rules to detect a fault condition. A fault condition may indicate that a particular BMS object meets one or more fault criteria, which may in turn indicate an issue with one or more BMS objects (e.g., equipment). As an example, a fault detection and diagnostic rule may define a desired temperature range for a space in a building site. If FDD engine 616 determines that the air temperature within the space exceeds a threshold corresponding to the desire temperature range (e.g., based on sensor data), FDD engine 616 may indicate a fault.

In some embodiments, FDD engine 616 may utilize a previously generated semantic site model to identify BMS objects associated with a fault detection rule. Specifically, for each application or implementation of a fault detection rule, FDD engine 616 can determine one or more BMS object needed to evaluate the rule using the semantic site model. The BMS objects may be identified based on the fault criteria for each fault detection rule. For example, the fault criteria may require a particular type of sensor measurement, a particular value, etc. When the fault detection rule is applied to a particular space, equipment, or point of a BMS or a building, the semantic site model may be used to identify the particular BMS objects that are referenced to determine the fault criteria.

In some embodiments, FDD engine 616 may also initiate automated corrective actions based on a detected fault condition. In some embodiments, a corrective action may be predetermined based on the type of fault condition, the fault detection rule, the BMS objects associated with the fault condition, etc. The corrective action may include, for example, controlling building equipment associated with the BMS objects in order to affect one or more parameters associated with the BMS objects. The corrective action can also include generating and transmitting a notification or a work order based on the detected fault.

A user interface generator 618 is configured to generate graphical user interfaces relating system 600. For example, user interface generator 618 may generate a graphical user interface for the user to enter preferences for a mapping object definitions, as discussed above with respect to object definition generator 612. In some embodiments, user interface generator 618 may provide a user interface to allow the user to define or select a model class for one or more object definitions. User interface generator 618 may also generate interfaces that allow a user to interact with a BMS (e.g., BMS 400), particularly after the BMS's configuration data has been classified according to mapped object definitions, as discussed above. It will be appreciated, however, that user interface generator 618 may be generally configured to generate any sort of graphical user interface.

Still referring to FIG. 6, system 600 is shown to include a communications interface 630. Processing circuit 602 can be communicably connected to communications interface 630 such that processing circuit 602 and the components thereof can send and receive data via the communications interface 630. System 600 may exchange data with network 446 and/or user device 632 via a communications interface 630, for example. Communications interface 630 may include a wired and/or wireless interface for connecting system 600 to network 446 and/or a user device 632. For example, communications interface 630 may include a wireless network adaptor for wirelessly connecting system 600 to network 446. In some embodiments, communications interface 630 also provides an interface between system 600, and any one or more the building subsystems 428, or other components of the BMS 400 or BMS 500 described above. In this regard, communications interface 630 can include a BACnet interface in addition to other types of communications interfaces (e.g., Modbus, LonWorks, DeviceNet, XML, etc.).

User device 632 may be any electronic device that allows a user to interact with system 600 through a user interface.

Examples of user devices include, but are not limited to, mobile phones, electronic tablets, laptops, desktop computers, workstations, and other types of electronic devices. User device 632 may be similar to client device 368 and/or client devices 504, as described above. User device 632 may display graphical user interfaces or other data on a display, thereby enabling a user to easily view data and interact with system 600. For example, user device 632 may present any of the user interfaces generated by user interface generator 618.

Figure 7A:
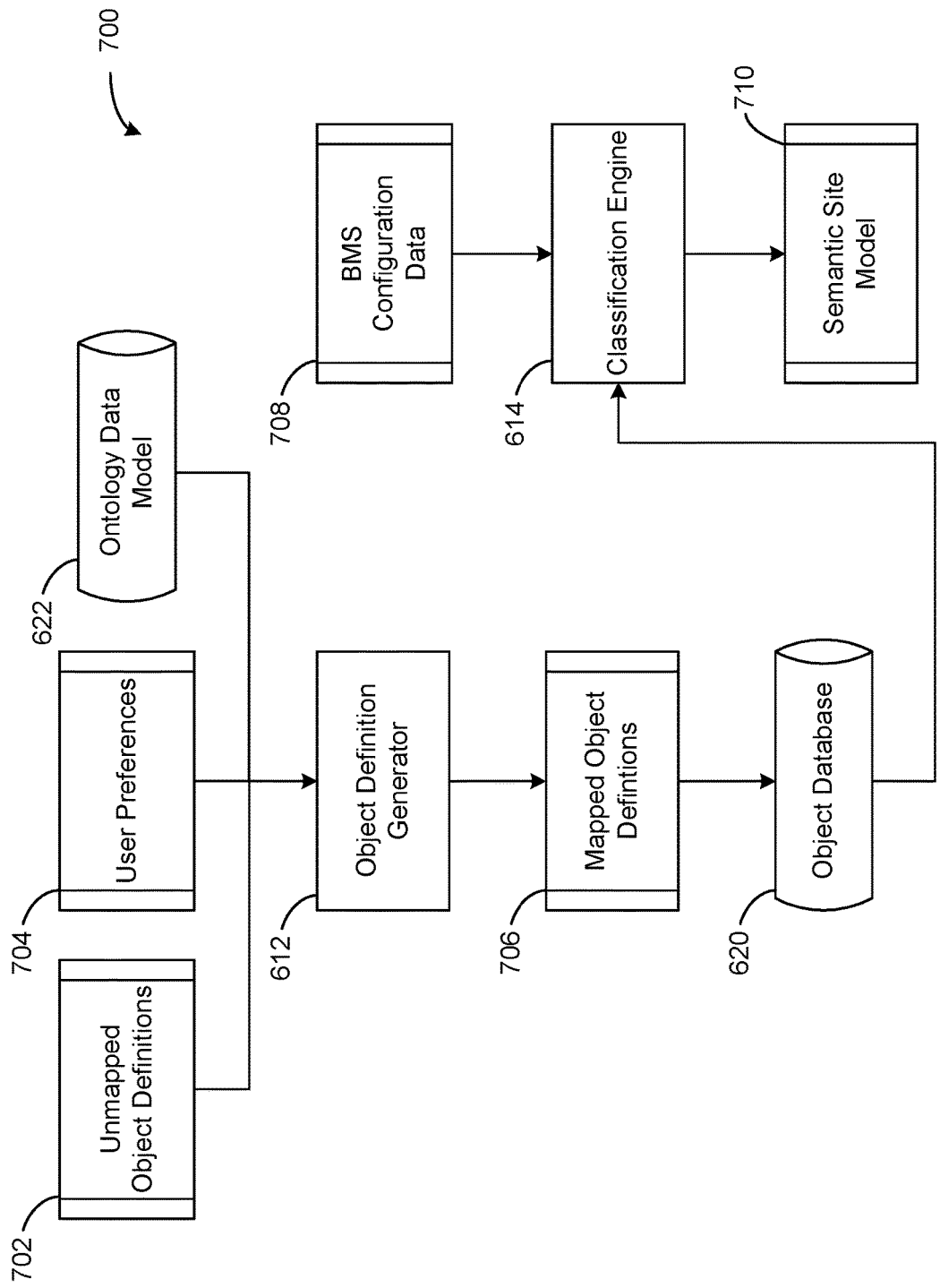
FIGS. 7A and 7B are block diagrams of a semantic modeling architecture, according to some embodiments.

Referring now to FIG. 7A, a block diagram of a semantic modeling architecture 700 is shown, according to some embodiments. Architecture 700 may be implemented by system 600, for example, and accordingly may illustrate the generation of a semantic site model by system 600. Architecture 700 is shown to include unmapped object definitions 702 and user preferences 704. Unmapped object definitions 702 can include one or more objects, data sets, files, etc., corresponding to one or more BMS object definitions, as described above with respect to FIG. 6. Similarly, user preferences 704 can include one or more individual settings, files, data sets, etc., that define user preferences. In general, user preferences 704 may include at least an indication of a model class to assign to each of one or more BMS object definitions. In some embodiments, user preferences 704 also include user selections of other object definition parameters, including BMS object labels, configuration settings, point definition labels, point definition short names (i.e., identifiers), and/or point definition search criteria.

Unmapped object definitions 702 and user preferences 704 may be obtained by, or fed into, object definition generator 612, along with ontology data model 622. As described above, object definition generator 612 may apply ontology data model 622 and/or user preferences 704 to unmapped object definitions 702. For example, object definition generator 612 may map the unmapped object definitions 702 to corresponding object definitions in ontology data model 622, and may subsequently or concurrently apply user preferences 704 to add, remove, or modify one or more parameters of each object definition. In other words, unmapped object definitions 702, user preferences 704, and ontology data model 622 may be combined or married by object definition generator 612 to generate mapped object definitions 706. Mapped object definitions 706 may then be stored in object database 620.

As a non-limiting example, an unmapped object definition (e.g., one of unmapped object definitions 702) for a particular BMS object representing an AHU may be obtained by object definition generator 612, along with ontology data model 622. Ontology data model 622 may include a variety of standardized information for AHU objects, such as AHU parameters (e.g., temperatures, fan speed, capacity, etc.), along with a plurality of point definitions associated with an AHU object. Each point definition may represent a particular point, sensor, device, etc., associated with a physical AHU. For example, the AHU object may include point definitions for fan status, fan speed, output air temperature, etc. Additionally, ontology data model 622 may define a plurality of model classes that can be assigned to BMS objects, and may also indicate model class relationships. User preferences 704 may include at least a user selection of a model class to apply to AHU objects. Object definition generator 612 can map the unmapped AHU object to the ontology data model 622 and can assign user preferences 704 to AHU object.

Mapped object definitions 706 can be retrieved or transmitted from object database 620 to classification engine 614.

Classification engine 614 may also obtain BMS configuration data 708 for a particular BMS and/or a particular building site, in order to apply mapped object definitions 706 to BMS configuration data 708. As described above with respect to FIG. 6, classification engine 614 may classify BMS configuration data 708, which can include objects corresponding to equipment, spaces, and/or points in a BMS (e.g., BMS 400), based on mapped object definitions 706. In other words, classification engine 614 can classify each BMS object of BMS configuration data 708 to a corresponding mapped object definition (e.g., one of mapped object definitions 706). Accordingly, each BMS object is also classified according to a model class assigned to a corresponding one of the mapped object definitions 706. The output of classification engine 614 is shown as a semantic site model 710. As described above, semantic site model 710 may be a model of a complete building site or a complete BMS that defines each BMS object associated with the site or BMS (e.g., each space, device, and/or point) according to mapped object definitions 706, and thereby according to ontology data model 622 and user preferences 704.

To continue the example above, the mapped object definition for the AHU can be retrieved from object database 620 by classification engine 614. Subsequently, configuration data for a first BMS that includes BMS objects for each of the equipment, spaces, and points within the first BMS may be obtain. The configuration data may be analyzed by classification engine 614 to identify any BMS objects that correspond to an AHU. The identified BMS objects may then be classified as, or mapped to, the mapped object definition for the AHU.

Figure 7B:
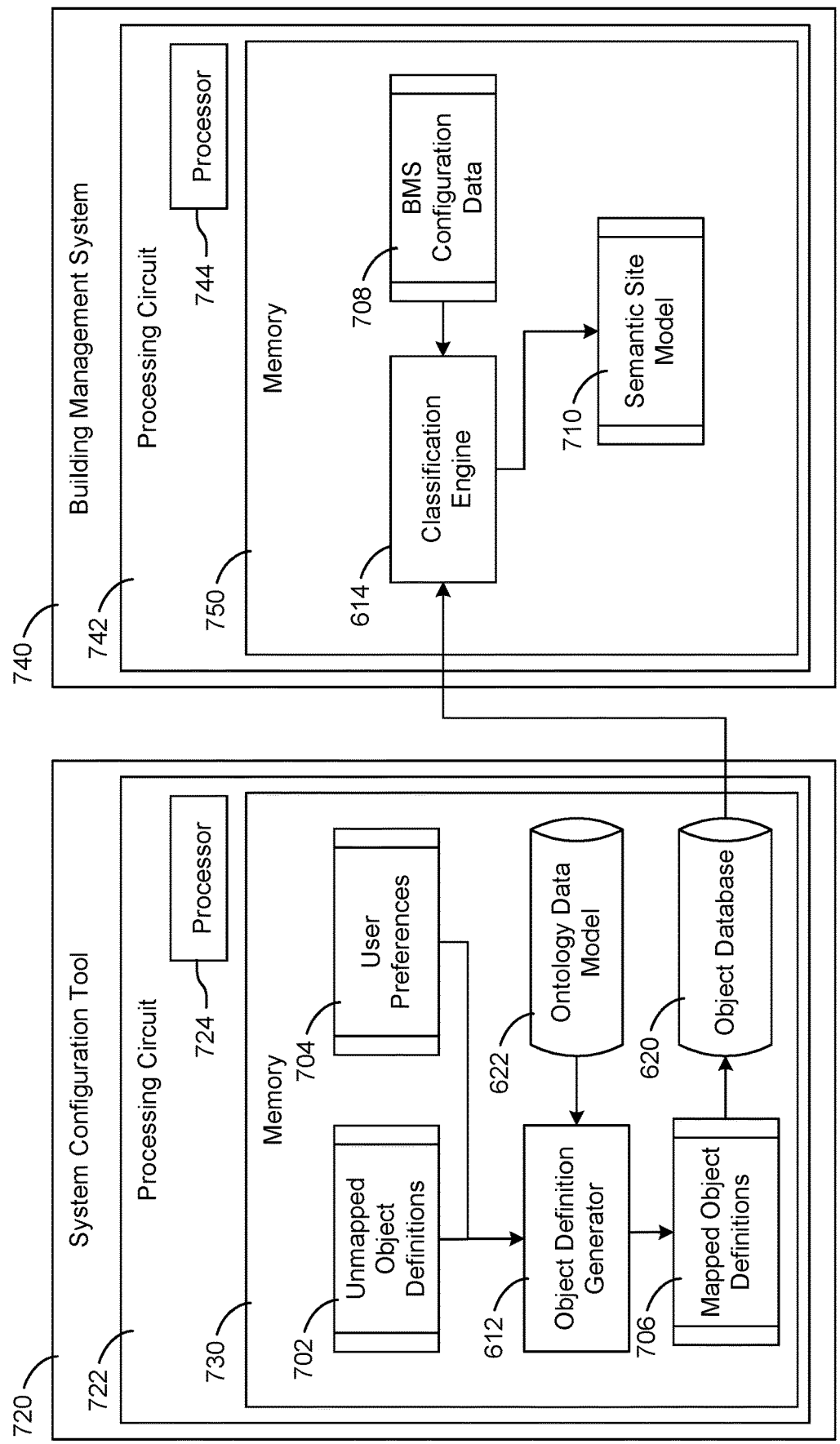

Referring now to FIG. 7B, an implementation of architecture 700 is shown, according to some embodiments. In particular, FIG. 7B shows various components of architecture 700 performed by a system configuration tool 720 and a BMS 740. As mentioned above, system configuration tool 720 may be a separate and/or remote system from a BMS (e.g., BMS 400), and/or may be a subsystem implemented within a BMS. In any case, system configuration tool 720 is generally configured to be implemented prior to operating a BMS (e.g., prior to construction of a building, prior to operating building equipment, etc.), in order to configure the BMS for operations. For example, system configuration tool 720 may be implemented prior to activating a BMS in order to configure BMS objects. In some embodiments, system configuration tool 720 is implemented when BMS 740 is offline, or when equipment of BMS 740 is disconnected.

System configuration tool 720 is show to include a processing circuit 722. Processing circuit 722 is shown to further include a processor 724 and memory 730. Similarly, BMS 740 is shown to include a processing circuit 742, further including a processor 744 and 730. It will be appreciated that BMS 740 may be substantially similar to, or the same as, either BMS 400 or BMS 500 described above. It will also be appreciated that these components can be implemented using a variety of different types and quantities of processors and memory. Processor 724 and/or processor 744 can be implemented as a general purpose processor, an application specific integrated circuit (ASIC), one or more field programmable gate arrays (FPGAs), a group of processing components, or other suitable electronic processing components.

Memory 730 and/or memory 750 (e.g., memory, memory unit, storage device, etc.) can include one or more devices (e.g., RAM, ROM, Flash memory, hard disk storage, etc.) for storing data and/or computer code for completing or facilitating the processes, layers and modules described in the present application. Memory 730 and/or memory 750 can be or include volatile memory or non-volatile memory. Memory 730 and/or memory 750 can include database components, object code components, script components, or any other type of information structure for supporting the activities and information structures described in the present application. In some embodiments, memory 730 and/or memory 750 are communicably connected to a corresponding one of processor 724 or processor 744 via processing circuit 722 or processing circuit 724. Each of memory 730 and memory 750 can include computer code for executing one or more processes described herein.

As shown, system configuration tool 720 may be configured to generate mapped object definitions 706 based on unmapped object definitions 702, user preferences 704, and ontology data model 622, as described above with respect to FIG. 7A. In this manner, mapped object definitions 706 may be generated prior to implementing, activating, or otherwise operating a BMS (e.g., BMS 740). For example, mapped object definitions 706 may be generated as part of a configuration process for BMS 740. Mapped object definitions 706 may be stored in object database 620 and subsequently transmitted to BMS 740 to generate semantic site model 710. In some embodiments, BMS 740 may receive mapped object definitions 706 as part of a configuration process, such as after implementing, activating, or otherwise operating BMS 740 and/or building equipment. For example, BMS 740 may receive mapped object definitions 706 after BMS 740 and any associated equipment is installed in a building, and after BMS 740 and/or the equipment is turned on or operated.

In some embodiments, BMS configuration data 708 is also generated once BMS 740 is activate or operated. For example, once BMS 740 is turned on and any associated equipment is connected, BMS 740 can be mined or analyzed to identify BMS objects corresponding to equipment, spaces, points, etc., as described above. The identified BMS objects and/or object relationships may be defined in BMS configuration data 708. BMS 740 may then classify BMS configuration data 708 according to mapped object definitions 706 in order to generate semantic site model 710, as described above. Semantic site model 710 may be referenced by a user of BMS 740 in subsequent operations.

Figure 8:
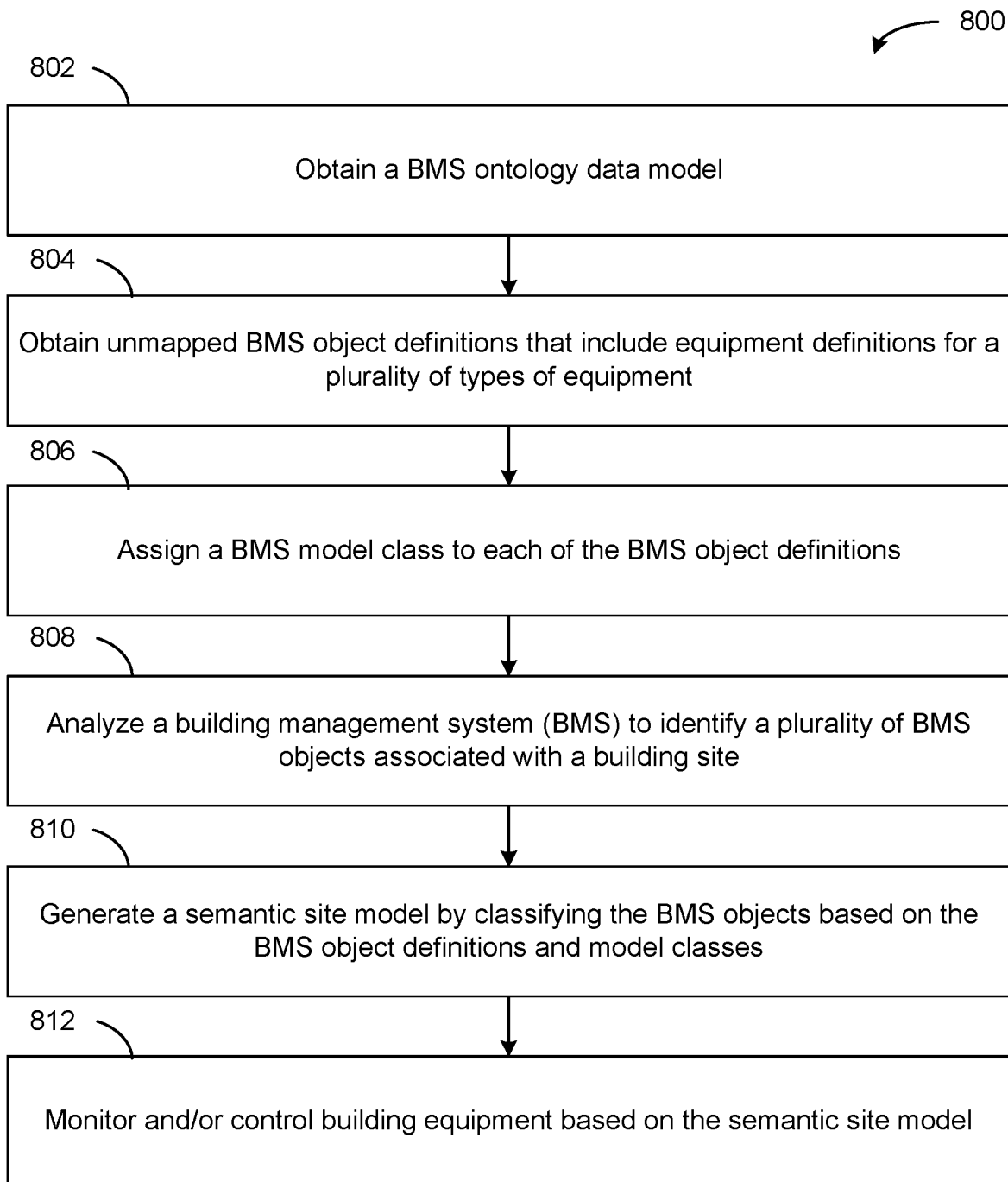
FIG. 8 is a flowchart of a process for generating a semantic site model, according to some embodiments.

Referring now to FIG. 8, a flowchart of a process 800 for generating a semantic site model is shown, according to some embodiments. Process 800 can be implemented by system 600 in order to generate a semantic model of a building or site served by BMS 400 or BMS 500, for example. As mentioned above, a semantic site model may beneficially "standardize" a BMS or building site according to a common data model. A standardized BMS may be easier for a user to understand and interact with, by describing BMS objects and object relationships semantically, and a semantic site model may decrease configuration time for new BMSs. Additionally, the semantic site model may classify BMS objects according to model classes to group BMS objects and to clearly identify BMS object relationships. It will be appreciated that certain steps of the process 800 may be optional and, in some embodiments, the process 800 may be implemented using less than all of the steps. In some embodiments, certain steps of process 800 may be performed by system configuration tool 720 and other steps may be performed by BMS 740, as described above with respect to FIG. 7B. For example, steps 802-806 can be performed by system configuration tool 720 while step 808-812 can be performed by BMS 740.

At step 802, a BMS ontology data model is obtained. As described above, the BMS ontology data model is generally a common data model that defines BMS objects according to a semantic description schema. The BMS ontology data model may include a tag library for describing a variety of objects found in a BMS (e.g., spaces, equipment, and points). The BMS ontology data model may also include a plurality of BMS model classes that can be assigned to various BMS objects and/or to various point definitions associated with a BMS object. A BMS model class is generally a semantic identifier that can be applied to a BMS object. For example, a BMS model class may indicate a type of equipment, space, or point.

At step 804, unmapped BMS object definitions are obtained. The unmapped BMS object definitions may be obtained from a database, for example. The unmapped BMS object definitions can include equipment definitions for a variety of different types of building equipment and/or point definitions for a variety of points associated with building equipment. An unmapped BMS object definition may be an abstracted representation of a particular type of building equipment, for example, and the unmapped BMS object definition may include a plurality of point definitions typically associated with the particular type of building equipment. For example, and as described in greater detail with respect to FIGS. 10A-10C, an unmapped BMS object definition for a VAV (e.g., VAV units 116) may include point definitions for zone air temperature, zone air setpoint, and supply fan status points. In some embodiments, the unmapped BMS object definitions can also include space definitions for a variety of different spaces within a building site, and can include additional point definitions for points associated with the different spaces.

At step 806, a BMS model class is assigned to each of the unmapped BMS object definitions. As described above, a model class is generally a semantic identifier that can be applied to a BMS object definition. Model classes can be used to classify or otherwise indicate a type of equipment, space, or point. For example, the model class may be a text sting or a label that identifies a class for a particular unmapped object definition, or for an equipment or a point definition associated with an unmapped object definition. In some embodiments, the BMS model class is automatically assigned to one or more unmapped BMS object definitions based on one or more parameters of the unmapped BMS object definitions. For example, search criteria (e.g., search terms), a short name, a type, a label, etc., associated with the unmapped BMS object definition may be identified, and a model class may be assigned based on any of the identified parameters.

In other embodiments, a user selection of a model class is received for each BMS object definition. For example, the user may select a model class from a list (e.g., based on the ontology data model) in order to assigned the selected model class to an unmapped BMS object definition. In some embodiments, a user may also defined one or more additional BMS object identifiers. In such embodiments, a user selection specifying one or more user-defined identifiers (e.g., short name, label, etc.) associated with a first unmapped BMS object definition may be received. The user selection of a model class and/or user defined identifiers for BMS object definitions is described in greater detail with respect to FIGS. 10A-11B.

In some embodiments, step 806 also includes applying the BMS ontology data model to the unmapped BMS object definitions. In some such embodiments, the BMS ontology data model is applied to the unmapped BMS object definitions concurrently with, or before or after, the model classes are assigned. As discussed above, mapped BMS object definitions are generated based on the assignment of model classes and/or the application of the BMS ontology data model. In other words, the previously unmapped BMS object definitions may be mapped to the BMS ontology data model in order to standardize the BMS object definitions, and the model classes are applied.

At step 808, a BMS is analyzed to identify BMS objects associated with a building site. In some embodiments, BMS configuration data can be mined, scanned, or otherwise analyzed to identify BMS object associated with a particular site. For example, the BMS configuration data is analyzed to determine the various spaces, points, and/or equipment associated with the building site and/or controlled by a BMS of the building site. BMS objects can include equipment entities representing specific instances of building equipment and point entities representing specific points in the BMS. BMS objects can also include space entities representing specific building spaces. In some embodiments, a BMS itself may be mined or analyzed in order to generate the configuration data.

At step 810, a semantic site model is generated by classifying the BMS objects based on the BMS object definitions and the model classes assigned to each of the BMS object definitions. In other words, the BMS object identified at step 808 may be classified or mapped to corresponding BMS object definitions, and thereby may be classified or mapped according to the model classes assigned to each BMS object definition. In some embodiments, BMS objects are classified according to an object identifier associated with each of the BMS object definitions. The object identifier may be a short name, a label, a number, or another type of identifier associated with each BMS object definition. For example, a first BMS object definition corresponding to a VAV type object may include a short name of "SF-S," which corresponds to a supply fan status. The BMS objects identified at step 808 may be analyzed to detect any BMS objects that also include an identifier of "SF-S." In some cases, search criteria may also be utilized to identify BMS objects. For example, the search criteria may include additional identifiers associated with a supply fan status. The BMS objects may also be analyzed to identify any BMS objects that include identifiers corresponding to the search criteria.

At step 812, building equipment is monitored and/or controlled based on the semantic site model. In some embodiments, the semantic site model is utilized to monitor equipment operations. In some embodiments, a user interface may be generated to present the semantic site model, or to present data associated with the semantic site model such as equipment or site operational data. In some embodiments, controlling the building equipment can include adjusting one or more operating parameters associated with the building equipment. For example, a setpoint may be modified for a particular building device. In any case, the semantic site model generated by process 800 may, advantageously, provide a user friendly method for interacting with a BMS. For example, the semantic site model defines BMS objects in a natural language that is easy for users to understand.

Additionally, the classification of BMS objects based on model classes and the relationships between BMS objects defined in the semantic site model can aid in system analytics or querying. Instead of searching for a BMS object by a string of characters or manually tracing equipment relationships, for example, a user may query the system (e.g., system 600) in a more natural way. For example, the user can ask the system simple questions, such as "what are the temperatures of all meeting rooms on the fourth floor?" Using the semantic site model, the system could search for BMS objects having a model class of "Zone Air Temperature" and could narrow the search to BMS objects related to spaces on the fourth floor of a building site. In this manner, the semantic site model may greatly increase user friendliness, and can also increase interoperability with other systems.

Figure 9:
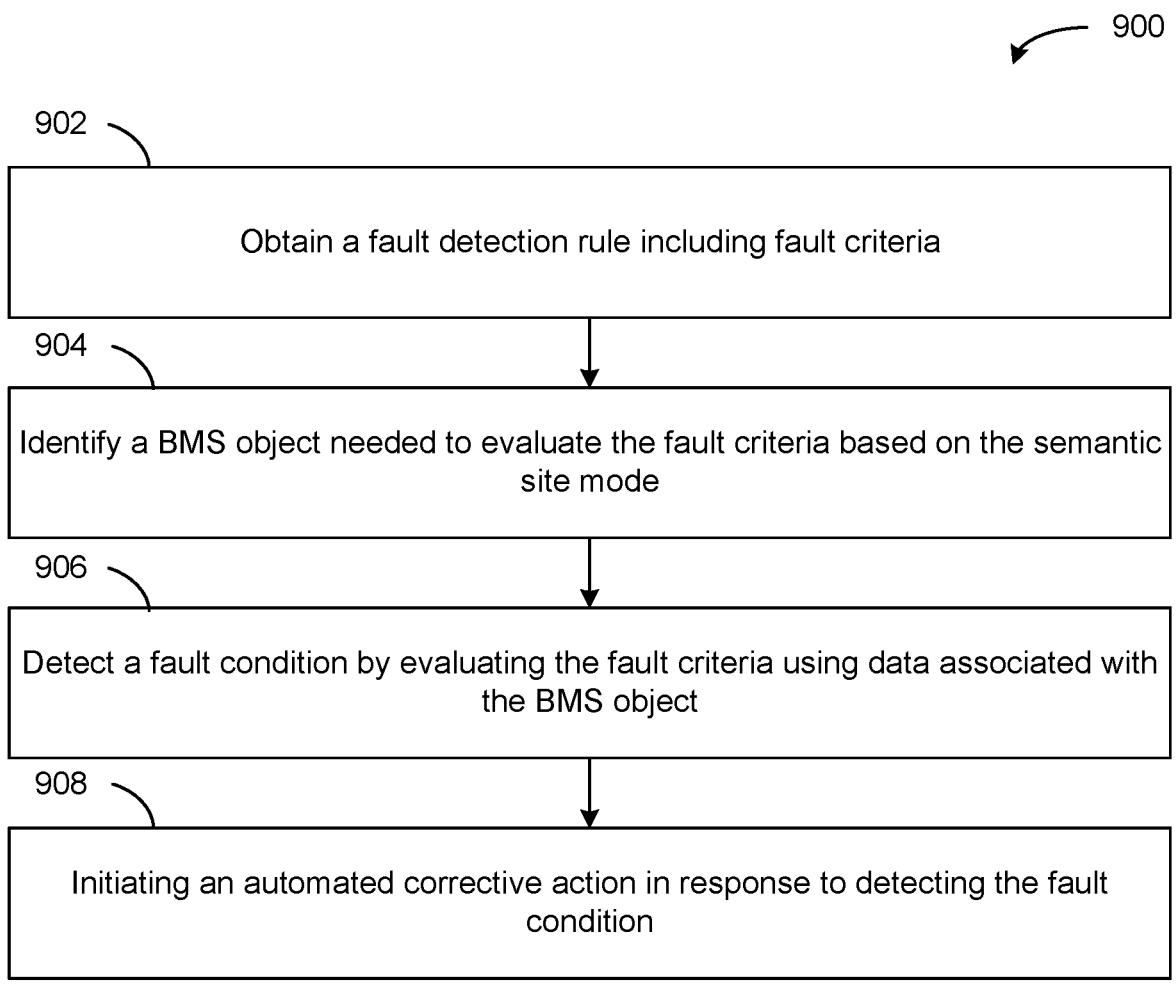
FIG. 9 is a flowchart of a process for fault detection and diagnostics using a semantic site model, according to some embodiments.

Referring now to FIG. 9, a flowchart of a process 900 for fault detection and diagnostics using a semantic site model is shown, according to some embodiments. Process 900 can be implemented by system 600 in order to facilitate fault detection and/or diagnostics for a BMS, for example. Process 900 may utilize a semantic site model to identify BMS objects associated with fault detection and diagnostic rules. In this regard, process 900 does not necessarily require that fault detection and diagnostics rules reference a particular BMS object. Advantageously, process 900 may allow for generic or non-site specific fault detection and diagnostic rules to be implemented and evaluated across a range of building sites or BMSs. It will be appreciated that certain steps of the process 900 may be optional and, in some embodiments, the process 900 may be implemented using less than all of the steps.

At step 902, at least one fault detection rule is obtained. The fault detection rule generally includes one or more fault criteria that are evaluated using BMS data (e.g., operating data) to detect fault conditions. Unlike fault detections rules for certain other systems, the fault detection rule obtain at step 902 does not include fault criteria that reference to a particular BMS object. In other words, the fault criteria are defined without reference to a particular BMS object. This allows the fault detection rule to be applied to any number of different building sites or BMSs, because the fault criteria do not rely on a particular BMS object. Additionally, the fault detections rule may be structured more broadly than other rules that rely on a particular object, and may be defined in a more natural way.

An example fault detection rule may include fault criteria such as "IF zone temperature is greater than a threshold AND a VAV damper position is closed" that, if true, may indicate a fault condition. In this example, the fault criteria variables of "zone temperature," "threshold," and "VAV damper position" can be defined in the fault detection rule without reference to the particular BMS object or objects that need to be analyzed in order to determine whether the fault detection rule is satisfied. For example, the particular temperature sensor corresponding to "zone temperature" and/or the particular VAV that supplies the "zone" or space do not need to be defined in the fault detection rule.

At step 904, a semantic site model (e.g., generated using process 800) is used to identify the particular BMS objects needed to evaluate the fault criteria. For example, the fault detection rule may be applied to a particular space or equipment of a BMS, and the semantic site model may be used to identify BMS object associated with the particular space or equipment. As described above, a single fault detection rule may advantageously be applied to multiple different building spaces, devices, points, etc. Accordingly, for each implementation or application of the fault detection rule, a new set of BMS objects may be identified to evaluate the fault criteria.

To continue the example above, the fault detection rule including fault criteria such as "IF zone temperature is greater than a threshold AND a VAV damper position is closed" could be applied to a particular building space (e.g., a room). The semantic site model could be be used to identify a specific zone temperature sensor that provides the "zone temperature" for the particular space, a particular threshold value, and a particular VAV or damper that controls airflow to the particular space. In this case, the relationships defined by the semantic site model may be used to identify the zone temperature sensor and/or VAV associated with the space, and the threshold value may be a parameter associated with a BMS object representing the particular space.

At step 906, a fault condition is detected by evaluating the fault criteria using data related to the particular BMS objects. Said data may include, for example, operational data or other data received from BMS objects represented in the semantic data model. For example, the data could include values from sensors or equipment within a building represented by the semantic site model. The received BMS object data may be compared to a value or a threshold for each fault criteria to determine if the fault criteria are "true" or "false." Depending on the particular fault detection rule, a fault condition may be detected if one or more of the fault criteria are "true." In some cases, multiple fault criteria or even all of the fault criteria may need to be "true" in order for a fault condition to be detected.

In the example above, the fault criteria may be evaluated by determining a reading (i.e., value) from the zone temperature sensor associated with the particular space, as identified using the semantic data model, and comparing the temperature sensor value to the threshold value obtained from the BMS object representing the particular space. Similarly, a value may be obtained from a sensor indicating a position of the damper for a VAV supplying the particular space, and the damper position may be analyzed to determine with the VAV damper position is "closed," and therefore matches the fault criteria.

At step 908, an automated corrective action is initiated in response to detecting a fault condition. The automated corrective action may include one or more individual corrective actions. For example, the automated corrective action can include controlling building equipment. In some embodiments, equipment can be controlled by adjusting an operating parameter of the equipment, turning the equipment off, taking the equipment office, activating additional equipment, etc. Generally, the equipment are controlled to correct the detected fault condition. In other words, the equipment can be controlled to affect one or more parameters associated with the fault criteria. For example, if a zone temperature is above a threshold value, HVAC equipment may be operated to reduce the temperature of a space corresponding to the zone temperature.

In some embodiments, the automated corrective action can include generating a work order and/or scheduling a maintenance activity for faulty equipment. The work order or maintenance request can be transmitted to a work order computer system, for example, or may be transmitted to a user device (e.g., associated with a maintenance or service technician). In some embodiments, automated corrective action includes presenting an indication of the fault condition to a user (e.g., of user device 632). As an example, a notification or alert may be generated and transmitted to the user's device as a text message, an email, a voice call, a push notification, etc. In some embodiments, a fault indication is presented on a user interface of a BMS system (e.g., BMS 400).

In some embodiments, a diagnostic process may also be implemented to determine a cause of the fault condition. The diagnostic process may also rely on the semantic site model, and in particular may rely on the relationships between BMS objects as defined in the semantic site model. For example, while one or more BMS object may be directly associated with a fault condition (e.g., the BMS object identified at step 906), additional BMS objects may also be identified that have some sort of impact on the detected fault condition. The semantic model may be analyzed to identify, based on the BMS object relationships, additional BMS objects that may be affected by the fault condition, or may have been at least partially responsible for causing the fault condition.

Referring now to FIGS. 10A-10C, an interface 1000 for viewing and modifying a BMS object definition is shown, according to some embodiments. More specifically, interface 1000 may allow a user to edit an object definition by adding, removing, or otherwise modifying one or more point definitions associated with the object definition. In some embodiments, interface 1000 allows a user to select a model class for each point definition associated with the object definition. Interface 1000 may also allow a user to adjust point definition labels, identifiers, and other point definition parameters, as discussed below. Interface 1000 may be generated by user interface generator 618 and presented to a user viewing user device 632, for example.

In the example shown in FIGS. 10A-10C, interface 1000 includes a plurality of point definitions associated with a particular BMS object, in this case a VAV unit (e.g., VAV units 116). Interface 1000 also includes various parameters or information associated with each point definition. Specifically, each point definition is shown with a point label in a "Label" column 1002. The point labels in column 1002 may be semantic descriptions of points in a BMS that correspond to the various point definitions. Each point definition is also shown to include an identifier or a "short name," listed in a "Short Name" column 1004, and a model class listed in a "Model Class" column 1006. Interface 1000 also includes a "Search Criteria" column 1008 that includes a number of search terms for each point definition. As shown in FIG. 10A, the example VAV unit entity object includes three points definition. As an example, a first point is shown as "Zone Air Temp," with a short name of "ZN-T" and a model class of "ZONE TEMPERATURE."

A user may select an "edit" button 1010 to add, remove, or modify point definition shown in interface 1000. Selecting button 1010 may dynamically modify interface 1000, as shown in FIG. 10B, to include a variety of control elements 1012. Control elements 1012 can include a plurality of button, icons, or other elements that facility adding, removing, or editing the various point definitions. For example, control elements 1012 can include separate buttons to add and remove point definitions, as well as buttons to navigate between the point definitions presented in interface 1000. The user may select a particular point definition, in this example "Zone Air Setpoint," as shown in FIG. 10B, and may edit the selected point definition. For example, the user may edit the point definition's label, short name, search criteria, etc. The user may also assign a model class to the selected point definition.

Figure 11A:
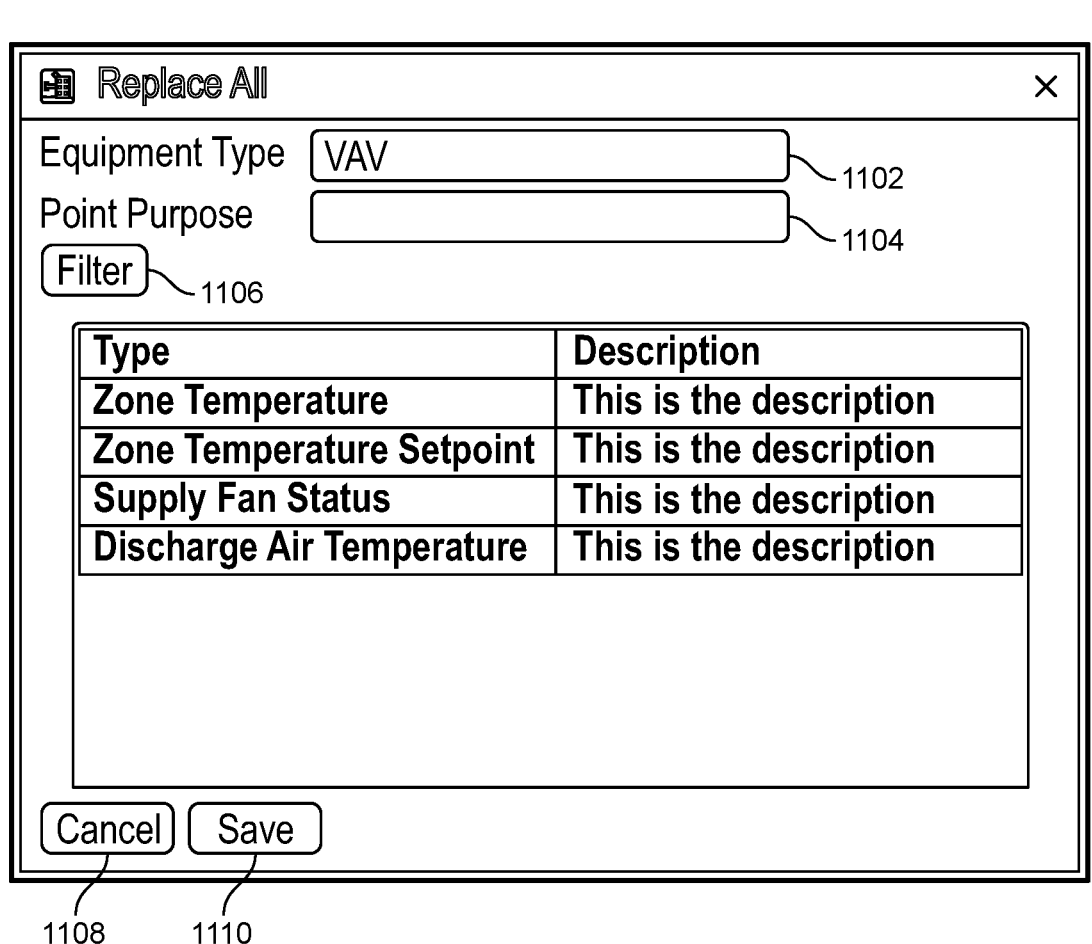
FIGS. 11A-11B show an example interface for defining a selecting a model class for a BMS object definition, according to some embodiments.
Figure 11B:
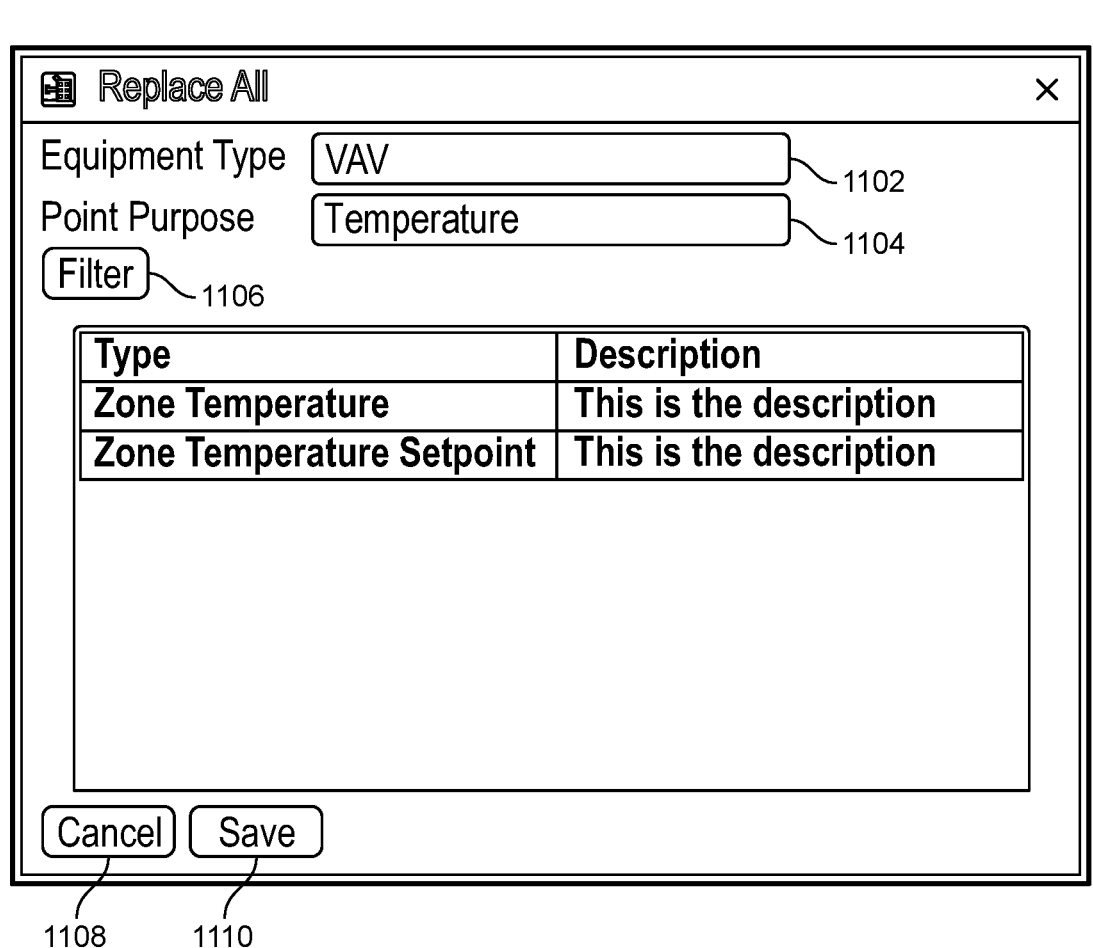

When a user attempts to assign a model class to a selected point definition, the user may be presented via a second interface for selecting a previously defined model class (e.g., a model class defined in the ontology data model, as described above). As shown in FIGS. 11A-11B, for example, an example interface 1100 for selecting a model class may be presented. Interface 1100 may be presented as an overlay to interface 1000 or a pop-up window, or in some cases may be a separate interface that entirely replaces interface 1000. Interface 1100 may include a list of all possible model classes that the user may select. In some embodiments, interface 1100 includes a "type" or an identifier for each model class and a brief description of the model class.

As shown, a user may select an equipment type in a first graphical element 1102 of interface 1100. In some embodiments, element 1102 may be a text entry field, a drop-down menu, or any other suitable graphical element for identifying a particular equipment type. As discussed above, the equipment type may include any of a variety of equipment types defined in the ontology data model. In the example shown in FIG. 11A, the user has selected a VAV as the equipment type in element 1102. This selection corresponds to the type of equipment associated with the object definition being viewed and/or modified in example FIGS. 10A-10C.

After selecting an equipment type (e.g., VAV), the user may select a point purpose from a second graphical element 1104. Like element 1102, element 1104 may be a text entry field, a drop-down menu, or any other suitable graphical element for identifying a point purpose. In some embodiments, element 1104 may not be populated until a particular equipment type is selected in element 1102. For example, element 1104 may be a drop-down menu, and the particular point purpose selections listed in the drop-down menu may not be populated until an equipment type is selected. Accordingly, the point purpose may be related to the equipment type selected using element 1102. In the example shown in FIG. 11B, the user has selected a point purpose of "Temperature".

Once the user has selected an equipment type or has selected both an equipment type and a point purpose, the user may select a "Filter" button 1106 to filter the list of model classes. Filtering the list of model classes may hide or remove model classes that do not correspond to the select equipment type and/or point purpose. In other words, only model classes that correspond to the equipment type and/or point purpose are populated in interface 1100. In the example of FIG. 11B, the user has filtered the list to only include model classes associated with VAVs, and more particularly with temperature. Accordingly, the list of model classes shown in FIG. 11B is shown to have been filtered to only include "Zone Temperature" and a Zone Temperature Setpoint." The user may then select a particular model class from the list and select a "Save" button 1110 in order to save the selected model class and assign it to the previously selected point definition. In some cases, the user may select a "Cancel" button 1108 to return to interface 1000 without assigning a model class to a point definition.

Referring back to FIG. 10C, the user's selection of a particular model class via interface 1100 is shown to have been populated in interface 1000, indicating that the user has assigned a model class to the selected point definition. In this example, the user has assigned a model class "ZONE SETPOINT" to a "Zone Air Setpoint" point definition. The user may subsequently choose to modify any of the other point definitions shown. Once model classes are assigned to any of the point definitions selected by the user, the user may select a "Save" button (e.g., one of control elements 1012) to save the changes. Alternatively, the user may select a "Cancel" button to disregard any changes (e.g., assigned model classes).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule Based logic and other logic to accomplish the various connection steps, processing steps, comparison steps and decision step.

What is claimed is:

1. A building management system (BMS) comprising:
one or more memory devices having instructions stored thereon that, when executed by one or more processors, cause the one or more processors to perform operations comprising:
obtaining a BMS ontology data model defining a plurality of BMS model classes and relationships between the BMS model classes;
assigning a BMS model class to a plurality of BMS object definitions, wherein the BMS model class is a semantic identifier selected from the plurality of BMS model classes defined by the BMS ontology data model;

generating a semantic site model by classifying a plurality of BMS objects associated with a building site according to the BMS object definitions and the BMS model classes assigned thereto; and transmitting a notification using the semantic site model.

2. The BMS of claim 1, the operations further comprising:

presenting, via a graphical user interface, the semantic site model;

receiving a user input indicating one or more user defined policies, wherein the user defined policies pertain to the BMS objects; and updating one or more control actions using the user defined policies, wherein the control actions include one or more parameter setpoints.

3. The BMS of claim 1, the operations further comprising:

determining, from a plurality of control actions, an optimal set of control actions using the semantic site model;

presenting, via a graphical user interface, the optimal set of control actions;

receiving a user input indicating a change to the optimal set of control actions; and updating the optimal set of control actions to include the change to the optimal set of control actions.

4. The BMS of claim 1, wherein assigning the BMS model class to each of the plurality of BMS object definitions further comprises:

receiving a user selection of the BMS model class for each of the BMS object definitions; and assigning the BMS model class to each of the plurality of BMS object definitions based on the user selection.

5. The BMS of claim 1, wherein the BMS objects associated with the building site include at least one of equipment objects representing specific building equipment and point objects representing specific points in the BMS.

6. The BMS of claim 1, wherein the BMS objects associated with the building site include space objects representing specific spaces in the building site and wherein the plurality of BMS object definitions further comprise space definitions defining a plurality of different spaces.

7. The BMS of claim 1, the operations further comprising:

obtaining a fault detection rule for the building site, the fault detection rule comprising one or more fault criteria defined without reference to one or more particular BMS objects needed to evaluate the fault criteria;

using the semantic site model to identify the particular BMS objects needed to evaluate the fault criteria; and detecting a fault condition by evaluating the one or more fault criteria using data associated with the particular BMS objects.

8. The BMS of claim 7, wherein evaluating the fault criteria comprises comparing a value provided by one or more of the particular BMS objects against a threshold.

9. A method comprising:

obtaining a BMS ontology data model defining a plurality of building management system (BMS) model classes and relationships between the BMS model classes;

assigning a BMS model class to a plurality of BMS object definitions, wherein the BMS model class is a semantic identifier selected from the plurality of BMS model classes defined by the BMS ontology data model;

generating a semantic site model by classifying a plurality of BMS objects associated with a building site according to the BMS object definitions and the BMS model classes assigned thereto; and transmitting a notification using the semantic site model.

10. The method of claim 9, further comprising:

presenting, via a graphical user interface, the semantic site model;

receiving a user input indicating one or more user defined policies, wherein the user defined policies pertain to the BMS objects; and updating one or more control actions using the user defined policies, wherein the control actions include one or more parameter setpoints.

11. The method of claim 9, further comprising:

determining, from a plurality of control actions, an optimal set of control actions using the semantic site model;

presenting, via a graphical user interface, the optimal set of control actions;

receiving a user input indicating a change to the optimal set of control actions; and updating the optimal set of control actions to include the change to the optimal set of control actions.

12. The method of claim 9, wherein assigning the BMS model class to each of the plurality of BMS object definitions further comprises:

receiving a user selection of the BMS model class for each of the BMS object definitions; and assigning the BMS model class to each of the plurality of BMS object definitions based on the user selection.

13. The method of claim 9, wherein the BMS objects associated with the building site include at least one of equipment objects representing instances of building equipment and point objects representing specific points in the BMS.

14. The method of claim 9, wherein the BMS objects associated with the building site include space objects representing specific spaces in the building site and wherein the plurality of BMS object definitions further comprise space definitions defining a plurality of different spaces.

15. The method of claim 9, further comprising:

determining one or more fault detection rules for the building site;

detecting a trigger condition based on the one or more fault detection rules, the trigger condition indicating a fault and a first BMS object associated with the fault; and identifying one or more additional BMS objects associated with the fault based on the semantic data model.

16. The method of claim 15, wherein the trigger condition comprises an indication that one or more parameters associated with the first BMS object exceed a threshold.

17. The method of claim 15, wherein determining one or more additional BMS objects associated with the fault comprises:

identifying a BMS model class associated with the first BMS object; and identifying the one or more additional BMS objects based on the relationships between the BMS model classes.

18. A building management system (BMS) comprising:

one or more memory devices having instructions stored thereon that, when executed by one or more processors, cause the one or more processors to perform operations comprising:

generating a semantic site model by classifying a plurality of BMS objects associated with a building site according to a plurality of BMS object definitions, each BMS object definition comprising an equipment definition defining a type of equipment and at least one point definition defining a type of point, wherein each BMS object definition is assigned a BMS model class selected from a BMS ontology data model;

obtaining a fault detection rule for the building site, the fault detection rule comprising one or more fault criteria defined without reference to one or more particular BMS objects needed to evaluate the fault criteria;

using the semantic site model to identify the particular BMS objects needed to evaluate the fault criteria;

detecting a fault condition by evaluating the one or more fault criteria using data associated with the particular BMS objects; and initiating an automated adjustment of one or more parameters associated with the particular BMS objects in response to detecting the fault condition.

19. The BMS of claim 18, the operations further comprising:

obtaining the BMS ontology data model defining a plurality of BMS model classes and relationships between the BMS model classes, wherein the BMS model classes are semantic identifiers selected from the plurality of BMS model classes defined by the BMS ontology data model.

20. The BMS of claim 18, wherein the BMS objects associated with the building site include space objects representing specific spaces in the building site and wherein the plurality of BMS object definitions further comprise space definitions defining a plurality of different spaces.

* * * * *